US009928224B1

(12) United States Patent
Days et al.

(10) Patent No.: US 9,928,224 B1
(45) Date of Patent: *Mar. 27, 2018

(54) ASSIGNING SLOTS TO CONTENT IN A PIPELINE

(71) Applicant: Amazon Technologies, Inc., Seattle, WA (US)

(72) Inventors: Adam Lloyd Days, Tacoma, WA (US); Adam Brent Johnson, Seattle, WA (US); Yashar Dehkharghani Fakhari, Lynnwood, WA (US); Mehul Gordhanbhai Sutariya, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 471 days.

This patent is subject to a terminal disclaimer.

(21) Appl. No.: 14/609,799

(22) Filed: Jan. 30, 2015

Related U.S. Application Data

(63) Continuation of application No. 13/760,485, filed on Feb. 6, 2013, now Pat. No. 8,949,712.

(51) Int. Cl.
| G06F 17/00 | (2006.01) |
| G06F 17/22 | (2006.01) |
| G06F 17/24 | (2006.01) |
| G06F 17/30 | (2006.01) |
| G06Q 30/02 | (2012.01) |

(52) U.S. Cl.
CPC ........ *G06F 17/2247* (2013.01); *G06F 17/248* (2013.01); *G06F 17/3089* (2013.01); *G06Q 30/0201* (2013.01)

(58) Field of Classification Search
CPC . G06F 17/211; G06F 17/3089; G06F 17/2247
USPC .................................................. 715/204, 234
See application file for complete search history.

(56) References Cited

U.S. PATENT DOCUMENTS

| 5,446,891 A | 8/1995 | Kaplan et al. |
| 5,749,081 A | 5/1998 | Whiteis |
| 5,774,123 A | 6/1998 | Matson |
| 5,825,651 A | 10/1998 | Gupta et al. |
| 5,848,396 A | 12/1998 | Gerace |
| 5,870,559 A | 2/1999 | Leshem et al. |
| 5,958,008 A | 9/1999 | Pogrebisky et al. |

(Continued)

OTHER PUBLICATIONS

U.S. Appl. No. 11/758,932, filed Jun. 6, 2007 and entitled "Real-time Adaptive Probabilistic Selection of Messages."

(Continued)

*Primary Examiner* — Stephen Hong
*Assistant Examiner* — Matthew Ludwig
(74) *Attorney, Agent, or Firm* — Thomas | Horstemeyer, LLP

(57) ABSTRACT

Disclosed are various embodiments for assigning user interface widgets to page slots associated with a page pipeline. In response to a request to generate a content page, content placement requests are then received from user interface widgets. The page slots are associated with a placement value indicating a value of the page slot relative to other page slots in the page template and can be weighted based upon their location in a page pipeline. The highest ranked user interface widgets according to an effectiveness metric or placement score are scheduled for placement in the content page.

20 Claims, 7 Drawing Sheets

(56) References Cited

U.S. PATENT DOCUMENTS

| | | | |
|---|---|---|---|
| 6,012,051 A | 1/2000 | Sammon et al. | |
| 6,606,102 B1 * | 8/2003 | Odom | G06F 17/3089 707/E17.116 |
| 6,636,836 B1 | 10/2003 | Pyo | |
| 6,735,572 B2 | 5/2004 | Landesmann | |
| 7,016,864 B1 | 3/2006 | Notz et al. | |
| 7,295,995 B1 | 11/2007 | York et al. | |
| 7,720,723 B2 | 5/2010 | Dicker et al. | |
| 8,219,447 B1 * | 7/2012 | Ieong | G06Q 30/0244 705/14.43 |
| 8,301,623 B2 | 10/2012 | Chakrabarti et al. | |
| 8,412,665 B2 | 4/2013 | Wang et al. | |
| 8,566,178 B1 | 10/2013 | Robinson et al. | |
| 2006/0107204 A1 * | 5/2006 | Epstein | G06F 17/212 715/243 |
| 2011/0014972 A1 * | 1/2011 | Herrmann | G06Q 30/0224 463/25 |
| 2012/0109956 A1 * | 5/2012 | Ramaiyer | G06F 17/30867 707/737 |
| 2014/0189525 A1 * | 7/2014 | Trevisiol | G06F 17/30 715/745 |

OTHER PUBLICATIONS

U.S. Appl. No. 13/555,388, filed Jul. 23, 2012, entitled "Assigning Slots to User Interface Elements."

* cited by examiner

ASSIGNING SLOTS TO CONTENT IN A PIPELINE

CROSS-REFERENCE TO RELATED APPLICATIONS

This application is a continuation of and claims the benefit of U.S. patent application Ser. No. 13/760,485, entitled "ASSIGNING SLOTS TO CONTENT IN A PIPELINE," and filed Feb. 6, 2013, which is hereby incorporated by reference in its entirety.

BACKGROUND

A network site may include any number of content pages, such as web pages. A network site for an online retailer may include, for example, one or more content pages for each category of items offered for order by the online retailer as well as other content pages. When a request to generate a content page is received from a client device via a browser, for example, the network site can personalize the content placed in the content page depending upon various factors.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
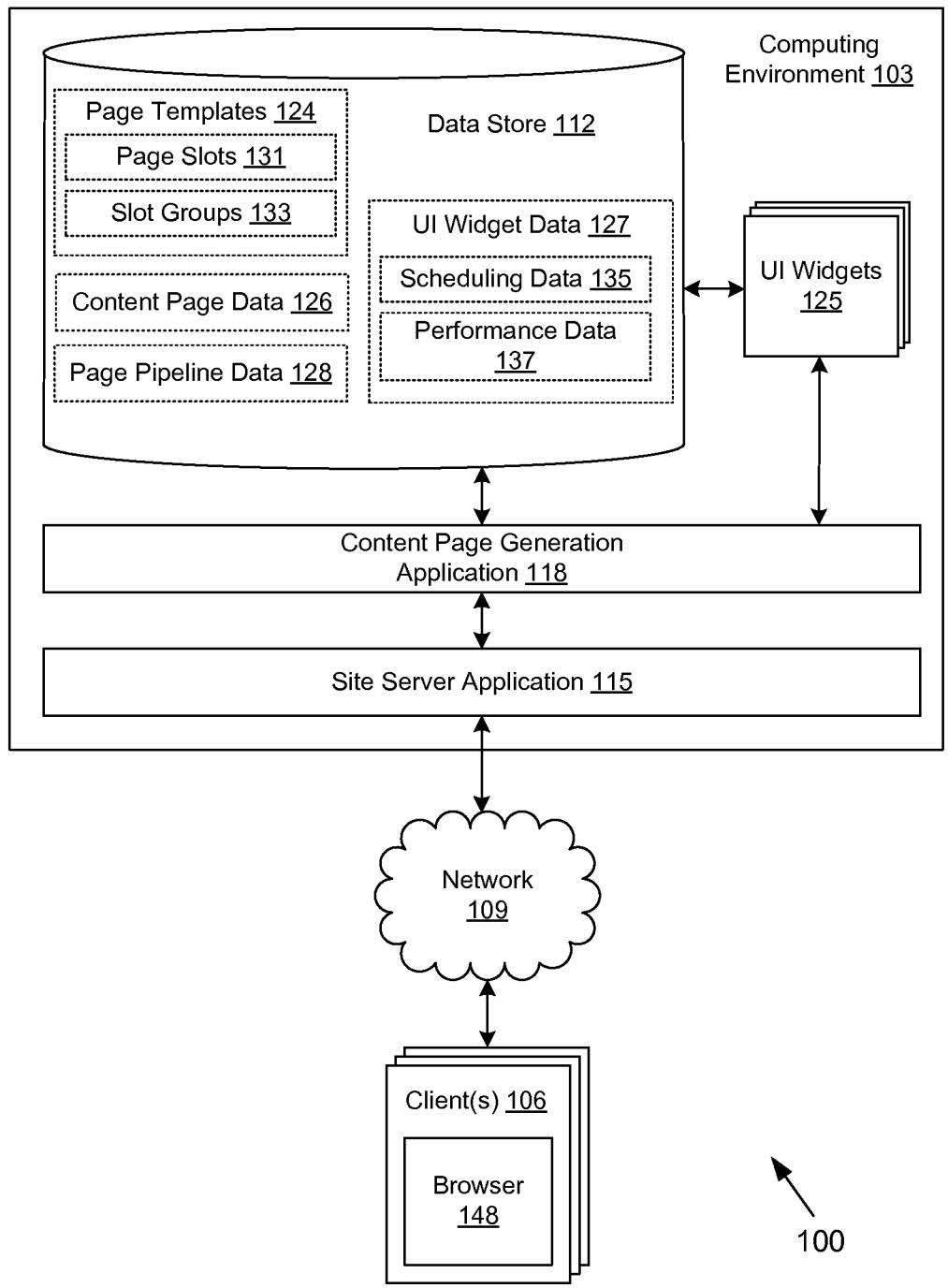
FIG. 1 is a drawing of a networked environment according to various embodiments of the present disclosure.

Embodiments of the present disclosure are directed to placement of content, such as user interface widgets, within page slots defined by a page template that is associated with a content page of a network site. Embodiments of the disclosure can select user interface widgets for placement within a content page from among multiple candidates based upon an effectiveness metric that is calculated for the candidate user interface widgets. In the case of a content page generated for an online retailer site or electronic commerce system, this effectiveness metric can be related to the profit and/or revenue generated by the user interface widget in relation to other user interface widgets. User interface widgets can also be matched with page slots in a content page based in part upon a content placement value of each of the page slots within a given page template. Additionally, page slots can also be segmented into various slot groups in which user interface widgets can be selected for placement in response to a request to generate a content page.

Embodiments of the disclosure further optimize placement of content within page slots within a requested content page by identifying a page pipeline, or a series of expected content pages that will be traversed by a user, and weighing various factors with respect to the page pipeline. For example, embodiments of the disclosure can analyze the content placement value of page slots across a pipeline of pages and match the page slots with user interface widgets. Additionally, the content placement value of a page slot and/or effectiveness metric of a user interface widget can be weighted by identifying a page pipeline in which to place a user and then taking into account the probability that the user will advance to various pages within the page pipeline.

Although the various embodiments herein are described in the context of a network site configured for an online retailer, it is understood that the principles disclosed herein may apply to any type of network site (e.g., search engine, social networking system, etc.) that could benefit from selection and/or placement of user interface widgets in content pages in a page pipeline depending upon any type of ranking of the user interface widgets according to any metric. Additionally, although embodiments of the disclosure are primarily described herein in the context of placing user interface widgets within slots of a page pipeline that corresponds to visual content, it is also understood that the principles disclosed herein may apply to various types of content that can be arranged in a pipeline format. For example, in a call center environment, a pipeline can include a series of stopping points within a touchtone workflow and slots within the pipeline can be content that is presented to the user in an audible menu at each of the stopping points.

A pipeline can also represent a behavior pipeline that represents various actions or presentations of content with regard to a user that are expected. For example, a behavior pipeline can represent the presentation of an advertisement or other content to a user, followed by the user's purchase of a product related to the content from an electronic commerce site or a brick and mortar store, followed by the user's subsequent interactions with another site in which content can be presented to the user. Each stage of such a behavior pipeline can be associated with content slots, or opportunities where content in various forms can be presented to the user.

With reference to FIG. 1, shown is a networked environment 100 according to various embodiments. The networked environment 100 includes a computing environment 103 that is in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores as can be appreciated. The data stored in the data store 112, for example, is associated with the operation of the various applications and/or functional entities described below.

The components executed on the computing environment 103, for example, include a site server application 115, a content page generation application 118, user interface (UI) widgets 125, and other applications, services, processes, systems, engines, or functionality not discussed in detail herein. The site server application 115 is executed to receive content page requests from the client 106 over the network 109, and to serve up content pages in response to the content page requests. The site server application 115 may comprise a web server application such as Apache Hypertext Transfer Protocol (HTTP) Server, Microsoft® Internet Information Services (IIS), and/or any other type of content page server application.

The content page generation application 118 is executed in response to a content page request received by the site server application 115 in order to generate a content page corresponding to the content page request. The content page generation application 118 can dynamically assemble a content page from a page template by generating a content page in which content generated from various user interface widgets are placed depending upon various factors associated with the request as will be described herein. In one embodiment, the content page generation application 118 includes an interpreter for JavaServer Pages (JSP) that generates a content page, such as a hypertext markup language (HTML) page from a JSP page that defines how the HTML page should be dynamically generated.

UI widgets 125 define one or more functional applications and/or services that may be executed to provide dynamic content for placement within a content page. As a non-limiting example, a UI widget 125 may generate markup language that is placed within a content page generated by the content page generation application 118 in response to a request to generate a content page received from a client 106. In one embodiment, a UI widget 125 can comprise JavaScript code or other client-side code that retrieves data that can be placed within a content page generated from a page template 124. In one embodiment, a UI widget 125 may comprise code that is executed by the content page generation application 118 to retrieve product recommendations as well as hyperlinks, text and imagery associated with the recommendations that can be placed in the content page. In this example, the product recommendations can be tailored to a user account associated with a user. Thus, the UI widget 125 can detect a user account associated with a browser session and obtain product recommendations generated by a product recommendation engine and place content related to the recommendations in the content page.

In some embodiments, UI widgets 125 can be implemented as various services that listen for an event associated with a request to generate a content page that is received by the site server application 115. In some embodiments, the UI widgets 125 can also listen for an identity of a page pipeline in which a user and/or request is placed. When the site server application 115 and/or content page generation application 118 receives such a request, the UI widgets 125 can initiate content placement requests that represent requests to schedule content for placement within the content page that is generated responsive to the request received from the client 106 to generate a content page and/or other content pages in the identified page pipeline. In response to a content placement request from UI widgets 125, the content page generation application 118 can select markup language generated by certain UI widgets 125 for placement in the content page based upon an effectiveness metric associated with the UI widgets 125 initiating such a request as well as other considerations.

In other embodiments, the content page generation application 118 can generate a ranking of UI widgets 125 with respect a known set of available UI widgets 125 based upon performance data as well as scheduling data that is stored in the data store 112 without receiving a scheduling request from a UI widget 125 implemented as a service that listens for requests to generate content pages. In this scenario, the content page generation application 118 can select certain UI widgets 125 according to data stored in the data store 112 and request the selected UI widgets 125 to generate markup language for placement within a content page based upon the effectiveness metric and content placement value with respect to a page pipeline and/or properties of a page pipeline in which a user associated with a content page request is placed.

In some embodiments, instead of employing a site server application 115, an application implementing a call center touchtone workflow, a braille reader, a video streaming service, or any other form of content delivery application can be employed. Accordingly, the content page generation application 118 can optimize placement of content in any type of content pipeline, such as in a pipeline of content in a call center environment in which touchtone inputs and/or voice commands are obtained from a user. As another example, the content page generation application 118 can also optimize placement of content from UI widgets 125 in a braille reader environment, where the page templates correspond to pages in a pipeline of braille content, and page slots correspond to content that can be presented in each page of the pipeline of braille content. As another example, the content page generation application 118 can optimize placement of content within a video stream. In this scenario, the page pipeline can represent various points in time within a piece of video content, and the page slots can correspond to locations within a user interface in which a video stream is presented during the running time of the video content. Therefore, it should be appreciated that while the examples discussed herein related to a page pipeline of a series of content pages presented in a web server environment or within an application environment in which content is shown on a display in page form, the content page generation application 118 can optimize content of any kind in any type of content pipeline.

In this sense, a page slot can also be referred to as a content slot. A content slot can represent any place, location, user interface, output device, or any mechanism by which content in any form, such as audio, video, or any other user experience, can be presented to a user. For example, a content slot can represent a channel or location on a screen of an interactive television experience. Additionally, as noted above, the content page generation application 118 can identify a behavior pipeline in which a user can be placed, where the behavior pipeline can include various stages that are each associated with one or more content slots. Each of these stages can represent any type of event that can be tracked by the content page generation application 118, whether such an event includes the requesting and/or generation of a content page, video stream, audio stream, or any other type of content, or an external event such as an event related to the user's location or the user's taking of any type of action (e.g., purchasing a product from a brick and mortar store).

Each of the stages of a behavior pipeline can also be associated with content slots, which represent opportunities at which the content page generation application 118 can present content to the user. The content slots in a behavior pipeline can also be associated with a placement value, and a UI widget can represent any other form of content or interaction with the user that can be facilitated by the content page generation application 118 within the context of the behavior pipeline. Accordingly, the content page generation application 118 can also optimize the presentation of content in such a behavior pipeline according to various embodiments of the disclosure.

The data stored in the data store 112 includes, for example, page templates 124, page pipeline data 128, content page data 126, and user interface widget data 127. Page templates 124 can specify the placement of user interface elements with which a user on a client 106 can interact. As a non-limiting example, in an electronic retail site implemented by the computing environment 103, the page templates 124 can specify the placement of text, imagery, buttons, etc., which can include user interface elements that facilitate the purchase of an item (e.g., an "Add to Cart" button). As an alternative example, a page template 124 for a search engine implemented by the computing environment 103 can specify where imagery, search forms, search results, etc. are placed on a content page generated by the content page generation application 118 for a user on a client 106.

Page pipeline data 128 includes information about page pipelines, which comprise an ordered collection of multiple content pages associated with page templates 124 that are linked together in some way. For example, a page pipeline can comprise an ordered collection of content pages that a user is likely to traverse in a site facilitated by the content page generation application 118. In this scenario, the page pipeline can include a site homepage, a search results page, and a product detail page, as many users are likely to progress through an electronic commerce site in such a fashion. A page pipeline can also include an action that is expected and/or hoped that to user takes, such as addition of a product to a shopping cart, purchase of a product, following of a hyperlink presented to the user, and/or any other action that is relevant to a content page presented to a user as can be appreciated.

Page pipeline data 128 can also identify one or more probabilities that users will progress from each page in the page pipeline to the next page in the pipeline. Page pipeline data 128 can also identify one or more probabilities that users will progress from each page in the page pipeline to other states, such as abandonment of the page pipeline and/or entry into another page pipeline. In this sense, a page pipeline can be represented by a Markov chain in which each content page in a page pipeline is represented as a possible state in the Markov chain, and the transitions from one page to the next page and/or another type of state (e.g., abandonment, expected action) are associated with the probability that user will advance to a possible state in the page pipeline.

In some embodiments, page pipeline data 128 can also represent information about any other type of content pipeline, such as a call center workflow through a user progresses when calling a call center. In this scenario, the site server application 115 and content page generation application 118 are configured to implement a call center workflow in which a user contacts a call center and is led through various prompts and/or menus at which voice and/or touchtone inputs are provided by the user. Accordingly, each stopping point at which user input is solicited can be viewed as a "content page" in the context of this disclosure, and the various voice prompts that are presented to the user can represent a UI widget in the context of this disclosure. Therefore, the prompts that are presented to the user can include information related to the purpose of the user's call as well as ancillary information, such as advertising content. These prompts can be optimized by determining an effectiveness metric of a given prompt as described herein.

As another example, page pipeline data 128 can also represent information about a video stream that can be presented to a user. In this scenario, a content page can represent a particular point in time and/or time window within a piece of video content, and a page slot can represent a portion of a user interface in which the video content is presented and in which content that is generated by UI widgets 125 can be placed. Other examples of content pipelines can also be optimized by the content page generation application 118 according to various embodiments of the disclosure.

The data store 112 also includes various user interface widget data 127 such as images, strings, video and other data that can be incorporated into markup language generated by a user interface widget 125. The markup language can be placed within a content page based upon a page template 124. Widget data 127 can also include scheduling data 135 and performance data 137 associated with the various widgets 125 that can be requested to generate markup language for placement within one or more page slots 131. Scheduling data 135 can include scheduling constraints and/or requirements regarding the placement of UI widgets 125 within a content page generated by the content page generation application 118. For example, scheduling data 135 can specify a percentage of content pages corresponding to a specific page template 124 in which a UI widget 125 should be placed due to business reasons, aesthetic factors, or any other factors as can be appreciated. For example, scheduling data 135 can be employed to manually override selection of UI widgets 125 for placement within a content page generated by the content page generation application 118 irrespective of the ranking of a UI widget 125 according to an effectiveness metric.

Performance data 137 can provide performance data associated with the various available UI widgets 125 according to the effectiveness metric. Accordingly, the content page generation application 118 can select UI widgets 125 based upon the performance data 137 and request that certain UI widgets 125 generate markup language for placement within a content page based upon the performance data 137 as well as scheduling constraints defined by the scheduling data 135.

The content page data 126 includes content pages and components thereof which are static or not otherwise generated by the content page generation application 118 such as images, strings, and other data incorporated into a content page. Page templates 124 also include one or more page slots 131 that specify locations within a content page in which content such as UI widgets 125 can be placed. Page slots 131 can also be associated with a placement value that indicates a value of a particular page slot 131 relative to other page slots 131 that are within a page template 124. Page slots 131 can also be associated with a placement value that indicates a value of a particular page slot 131 relative to other page slots 131 that are within page pipeline comprising a collection of multiple content pages and/or page templates 124. The placement value can represent a metric that is linked with an amount of user attention that a particular page slot is predicted to receive based upon its location in a content page. For example, a top center page slot may be associated with the highest placement value because it may receive the highest amount of user attention as compared to a page slot in a footer location. Additionally, a placement value can also take into account one or more other factors, such as a click rate associated with the page slot 131, a conversion rate associated with content placed in the page slot 131, and/or economic factors, such as a profitability or revenue metric associated with the page slot 131. The placement value can also take into account other engagement metrics associated with a page slot 131, such as an amount of time that a population of users of a site interacts with the page slot 131 relative to other page slots 131 in the page template 123. Such an engagement metric can be represented by a mouse hover time associated with the page slot 131 or any other form of user interaction with a location within a page template 123. Accordingly, the page slots 131 of a particular page template 123 can be effectively ranked within a page template 124 according to the placement value associated with each page slot 131.

Page slots 131 can also be grouped into slot groups 133. A slot group 133 can include multiple page slots 131 that possess a common characteristic, such as a geometry of the page slot 131, proximity of the page slots 131 relative to one another, and/or placement values of the page slots 131. For example, page slots 131 having a common geometry can be assigned to a common slot group 133. Accordingly, the UI widgets 125 that are candidates for placement within the page slots 131 can be chosen to produce markup language for the common geometry and without regard to a particular page slot 131 within the slot group 133 in which the UI widget 125 is placed.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 148 and/or other applications. The browser 148 may be executed in a client 106, for example, to access and render content pages, such as web pages, or other network content served up by the computing environment 103 and/or other servers. The client 106 may be configured to execute applications beyond browser 148 such as, for example, email applications, instant message applications, and/or other applications.

Next, a general description of the operation of the various components of the networked environment 100 is provided. To begin, a browser 148 executed in a client 106 can generate a request to generate a content page, which is transmitted via the network 109 to the site server application 115. The site server application 115 can invoke the content page generation application 118, which identifies a particular page template 124 associated with the requested content page and dynamically generates a content page, which the site server application 115 transmits to the client 106 via the network 109.

Accordingly, to generate such a content page in response to receiving a request to generate a content page, the content page generation application 118 selects UI widgets 125 for placement in the content page. In order to select the appropriate UI widgets 125 for placement within the content page, the content page generation application 118 identifies a page pipeline in which to place a user corresponding to the requested content page based upon the arrival characteristics of the request. The arrival characteristics can comprise user profile data of a user account of a user associated with the content page request. The arrival characteristics can take into account the history of a user with respect to a given site (e.g., purchase history, browse history, etc.). The arrival characteristics can also include a referrer link, user session data, or any other contextual data related to a request to generate a content page that is received by the content page generation application 118.

Accordingly, upon detecting the arrival characteristics of a request to generate a content page, the content page generation application 118 places a user corresponding to the request into a page pipeline based upon the arrival characteristics. As noted above, the page pipeline specifies various probabilities that a user may progress to subsequent states of the page pipeline. A page pipeline can also represent a particular activity or context associated with a request to generate a content page. Accordingly, the content page generation application 118 can identify an activity or context associated with the arrival characteristics. For example, the content page generation application 118 can identify a purpose of a user in requesting a content page and present content in the page slots that are optimized based upon the identified purpose. For example, the content page generation application 118 may be able to identify, based upon the arrival characteristics, a product and/or class of products that a user is browsing. In such a scenario, the content page generation application 118 can generate a ranking of UI widgets 125 based on how they relate to the product and/or class of products that the user is seeking.

In other embodiments, the content page generation application 118 can calculate the effectiveness metric of the various UI widgets 125 that are scheduled for placement within the page pipeline according to the scheduling data 135 according to an effectiveness metric or placement score, which, as noted above, can be related to profitability, revenue, or any other metric as can be appreciated. An effectiveness metric can also be related to a volume of items sold by a particularly UI widget 125 in an electronic commerce system. The effectiveness metric can also relate to an engagement metric, such as a click-through rate associated with a particular UI widget 125. Another example of such an engagement metric is a dwell time, or an amount of time that a population of users of a site focus their attention (e.g., hovers a mouse pointer above or near a UI widget 125, etc.), on a particular UI widget 125 relative to other UI widgets 125. The engagement metric can further relate to a conversion rate of a UI widget 125, where conversion of a user can be defined in various ways. For example, conversion of a user can correspond to engagement or interaction with a widget, whether the UI widget 125 results in the sale of a particular item in an electronic commerce system, or any other type of user conversion as can be appreciated. The effectiveness metric can also be related to minimizing an abandonment rate associated with the page pipeline or maximizing the probability that a user advances to a subsequent stage of a page pipeline.

Accordingly, the performance data 137 can define the effectiveness metric associated with the various widgets upon which a ranking can be based. Calculation of such a score and ranking of UI widgets 125 according to a calculated score can also be accomplished as described in U.S. patent application Ser. No. 11/758,932 filed Jun. 6, 2007 and entitled "Real-time Adaptive Probabilistic Selection of Messages," which is incorporated herein by reference in its entirety. The effectiveness metric can also include some degree of randomness so that lowly ranked UI widgets 125 and/or new UI widgets 125 receive an opportunity for placement within content pages. Additionally, the matching of UI widgets 125 with page slots 131 and/or slot groups 133 can also be accomplished as described in U.S. patent application Ser. No. 13/555,388, filed Jul. 23, 2012, entitled "Assigning Slots to User Interface Elements," which is incorporated herein by reference in its entirety.

As noted above, in one embodiment, the content page generation application 118 can generate an event that informs the various UI widgets 125 that a request to generate a content page has been received. In response to such a request, one or more UI widgets 125 can generate requests for placement within a page pipeline corresponding to the requested content page and/or arrival characteristics of the request. In response to receiving such a content placement request, the content page generation application 118 can generate a ranking of the UI widgets 125 according to the effectiveness metric of the various widgets.

The content page generation application 118 can then select the highest ranked UI widgets 125 according to the effectiveness metric and request that the highest ranked UI widgets 125 generate markup language for placement within available page slots 131 defined by the page templates 124 of pages making up the page pipeline. In some embodiments, the content page generation application 118 can also place the UI widgets 125 into the page slots 131 so that the highest ranked UI widget 125 is placed in the page slot 131 having the highest placement value in the page pipeline, the second highest ranked UI widget 125 is placed in page slot 131 having the second highest placement value in the page pipeline, and so on. Accordingly, once UI widgets 125 are matched with page slots 131 across an entire page pipeline, the requested content page can be generated with the UI widgets 125 assigned to the page slots 131 within content page. In this way, the content page generation application 118 can optimize placement of UI widgets 125 across an entire page pipeline rather than just within a single page slot that may be defined by the page template 124.

Accordingly, upon generating the requested initial content page, the content page generation application 118 can detect whether a subsequent request for a content page associated with the same user and/or session corresponds to a subsequent content page and/or state of the page pipeline in which the initial request and/or user was placed. If a subsequent request for a content page that is associated with a subsequent state in a page pipeline is detected, the content page generation application 118 can again generate a ranking of the UI widgets 125 requesting placement in the subsequent content page. In one embodiment, the content page generation application 118 can then generate the subsequent content page with the UI widgets 125 that are identified for placement within the page slots 131 of the subsequent content page when the initial content page was generated. In other embodiments, the content page generation application 118 can generate a new ranking of UI widgets 125 with respect to the remainder of the page pipeline.

It should be appreciated that some UI widgets 125 considered for placement within the page pipeline may fail to achieve a high enough ranking relative to other UI widgets 125 and that these UI widgets 125 may fail to gain placement within a page of the page pipeline. In other words, there may be more UI widgets 125 considered for placement within the page pipeline than there are available page slots 131. In some scenarios, a single UI widget 125 can be associated with multiple requests to place content within a page pipeline. For example, a UI widget 125 can be configured to generate multiple types of content for placement various location in a content page as well as in various pages in a page pipeline. A UI widget 125 configured to generate product recommendations in an online retail site may generate recommendations related to a user's purchase history when invoked a first time in a page pipeline and then may generate recommendations related to recently viewed products by the user when invoked a second time in the page pipeline.

Additionally, in some embodiments, the content page generation application 118 can also consider the various UI widgets 125 for placement within the various slot groups 133 defined by the page template 124 in a page pipeline according to one or more properties associated with each of the slot groups 133. The content page generation application 118 can then generate a ranking of UI widgets 125 considered for placement in a particular slot group 133 according to the effectiveness metric. In some cases, a slot group 133 may also traverse multiple pages in a page pipeline. Accordingly, the page pipeline data 128 can link slot groups 133 in multiple page templates 124 together with one another.

The properties associated with each of the slot groups 133 can comprise one or more properties shared by the page slots 131 within the slot groups 133, such as, geometry of the page slots 131, location of the page slots 131 within the page template 124, a placement value range, or other properties of a page slot 131 as can be appreciated. Upon generating a ranking of the UI widgets 125 for each of the slot groups 133, the content page generation application 118 assigns the UI widgets 125 to page slots 131 within the slot groups 133 according to the ranking and placement value of the page slots 131. For example, a highest ranked UI widget 125 is assigned to a page slot 131 within a slot group 133 having the highest placement value, a second highest ranked UI widget 125 is assigned to a page slot 131 within the slot group 133 having the second highest placement value, and so on.

Upon assigning a UI widget 125 to a particular page slot 131 in a content page that is in a given page pipeline according to an effectiveness metric ranking as well as placement value of the page slot 131, the content page generation application 118 can request that the UI widgets 125 generate markup language for placement within their assigned page slots 131. In one embodiment, the content page generation application 118 can initiate these requests in parallel to speed the time required for generation of a content page. In some embodiments, the content page generation application 118 can initiate these requests for subsequent pages in the page pipeline even before the user visits the subsequent pages as a form of prefetching content for placement in the subsequent content page.

Additionally, the markup language generated by certain UI widgets 125 may be dependent upon the ranking of the UI widget 125 relative to other UI widgets 125 that are selected for placement within a page template 124 as well as the relative position of page slots 131 and/or a page template 124 within a page pipeline. Accordingly, the content page generation application 118 can provide to a UI widget 125 its ranking relative to other widgets scheduled for placement in the request to generate markup language. In some embodiments, the content page generation application 118 can provide a listing of the UI widgets 125 that are ranked above a particular UI widget 125 according to the effectiveness metric.

In some scenarios, one or more of the UI widgets 125 placed in a page slot 131 of the page template 124 corresponding to the requested content page may experience an error that causes generation of the markup language to fail. Accordingly, in such a scenario, the content page generation application 118 can select a next highest ranked UI widget 125 according to the effectiveness metric and request that the next highest ranked UI widget 125 generate markup language for placement within the content page. The content page generation application 118 can provide in the request an identity of the UI widgets 125 that are, at the time of failure, ranked above the UI widget 125 according to the effectiveness metric in the event that the next highest UI widget 125 is context aware.

Accordingly, as noted above, UI widgets 125 can be ranked according to an effectiveness metric that gauges the ability and/or success rate of a widget in achieving a certain result with respect to the pipeline of content pages. For example, the effectiveness metric of a UI widget 125 can take into account the ability of the widget to minimize the abandonment rate of users with respect to page pipelines associated with a site facilitated by the content page generation application 118. As noted above, the effectiveness metric of a UI widget 125 can take into account the ability of the widget to maximize the possibility of other actions taken by a user with respect to a page pipeline, such as competing a purchase, adding a product to a virtual shopping cart, clickthrough rates, or other user engagement measures as can be appreciated.

Additionally, as also noted above, page slots 131 in a page pipeline can be associated with a content placement value that represents the value of a slot given its location and/or dimensions within a given page template 124. Accordingly, the placement value of a page slot 131 can be weighted based upon the location of a page template 124 within a given page pipeline. Therefore, based upon arrival conditions of a request to generate a content page, the content page generation application 118 can assign the request to a particular page pipeline, and the placement value of the page slots 131 of the pages in the page pipeline are weighted according to the probability that the user will arrive at the content page on which the page slot 131 is located. Such probabilities can be determined based upon an analysis of the behavior of a population of users, where the behavior of users throughout a site are analyzed and statistical data is aggregated to assemble page pipelines, or ordered collections of page templates 124 corresponding to content pages that users may have a tendency to traverse. Additionally, these probabilities can also be determined and/or adjusted based on specific behaviors of a user through analysis of a user's session.

Accordingly, if, for example, there is an extremely low probability that a user will arrive at the last page in a page pipeline, the placement values associated with the page slots 131 in the corresponding page template 124 can be weighted appropriately to reflect this low probability when the content page generation application 118 matches page slots 131 with UI widgets 125 according to the weighted content placement value of the page slots 131 in the page pipeline and the effectiveness metric of the UI widgets 125.

Figure 2:
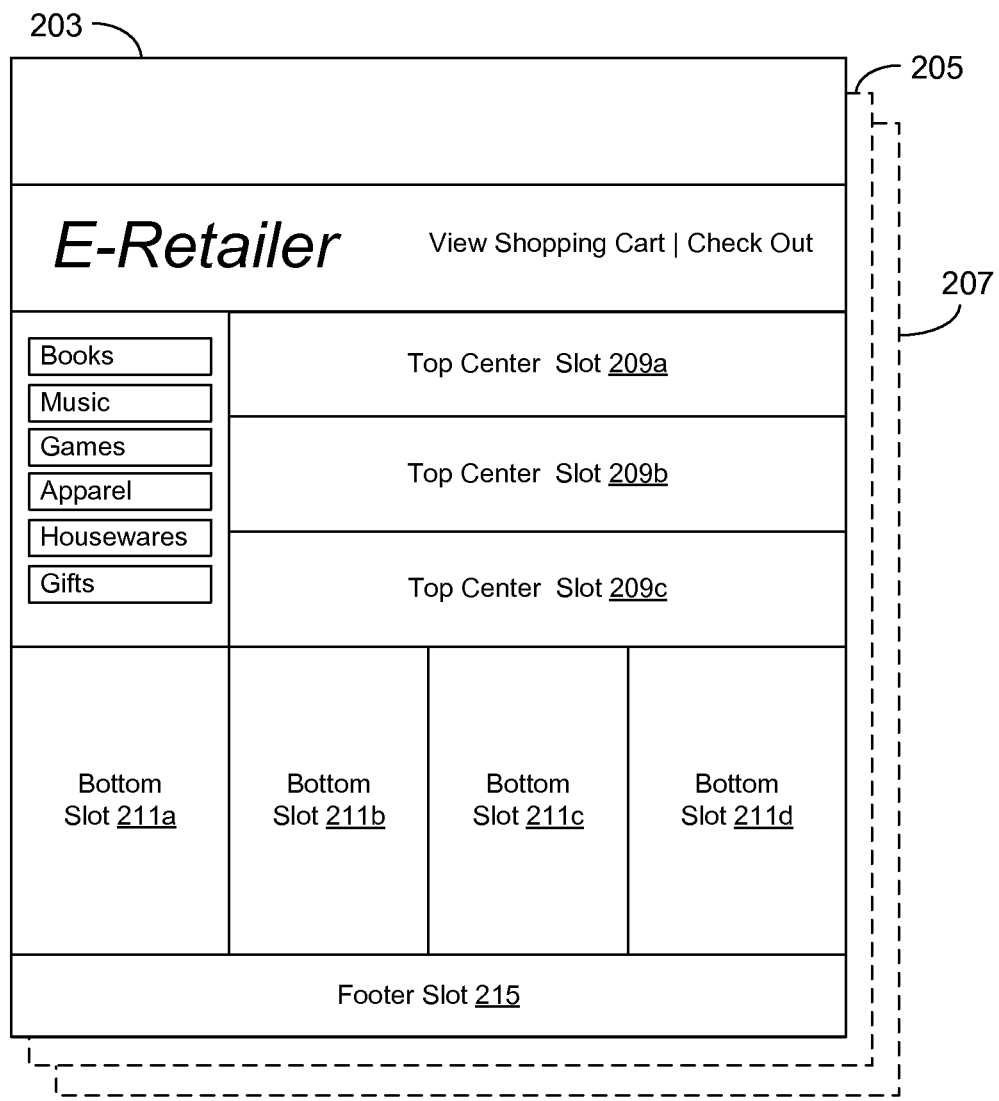
FIGS. 2-4 are drawings of an example of an illustration of page slots in a content page associated with a page template in a page pipeline employed in the networked environment of FIG. 1 according to various embodiments of the present disclosure.
Figure 3:
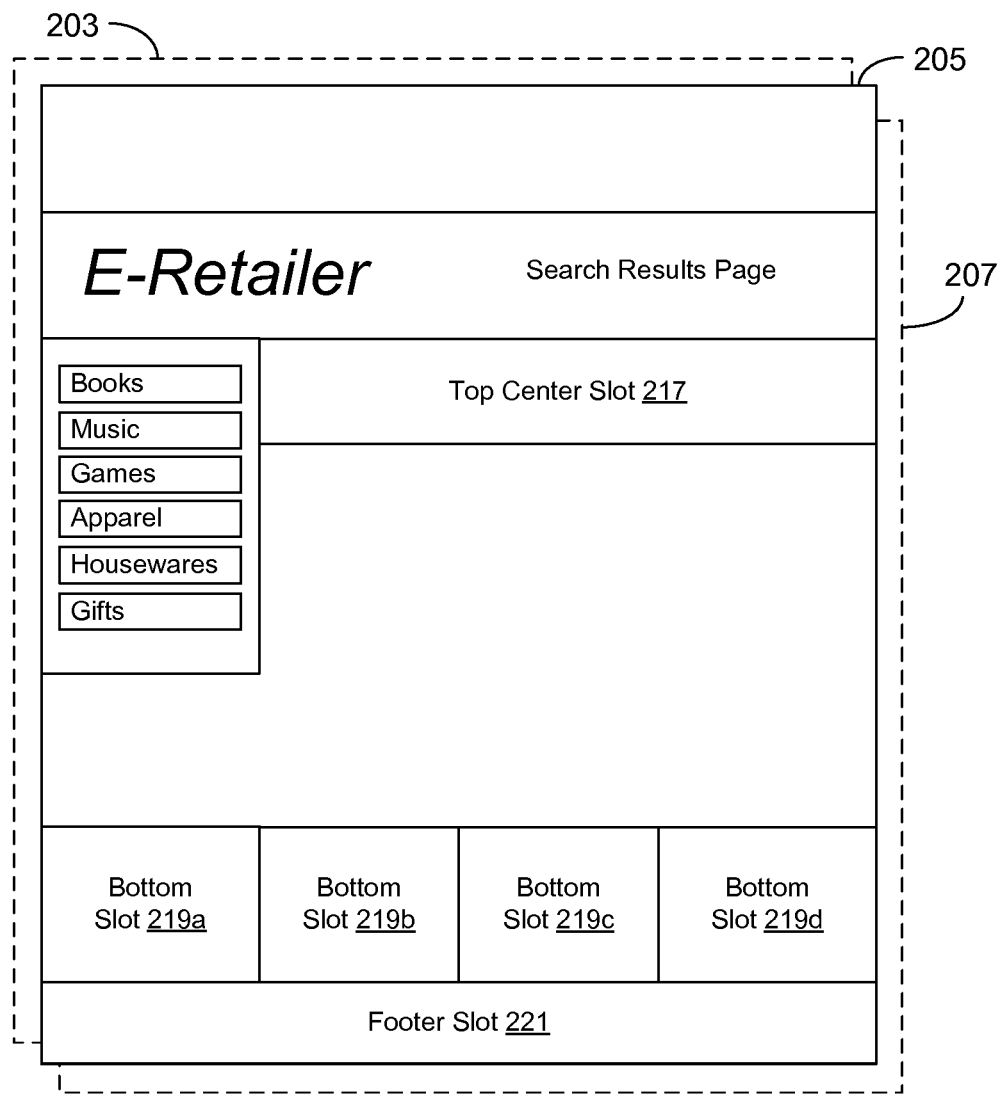
Figure 4:
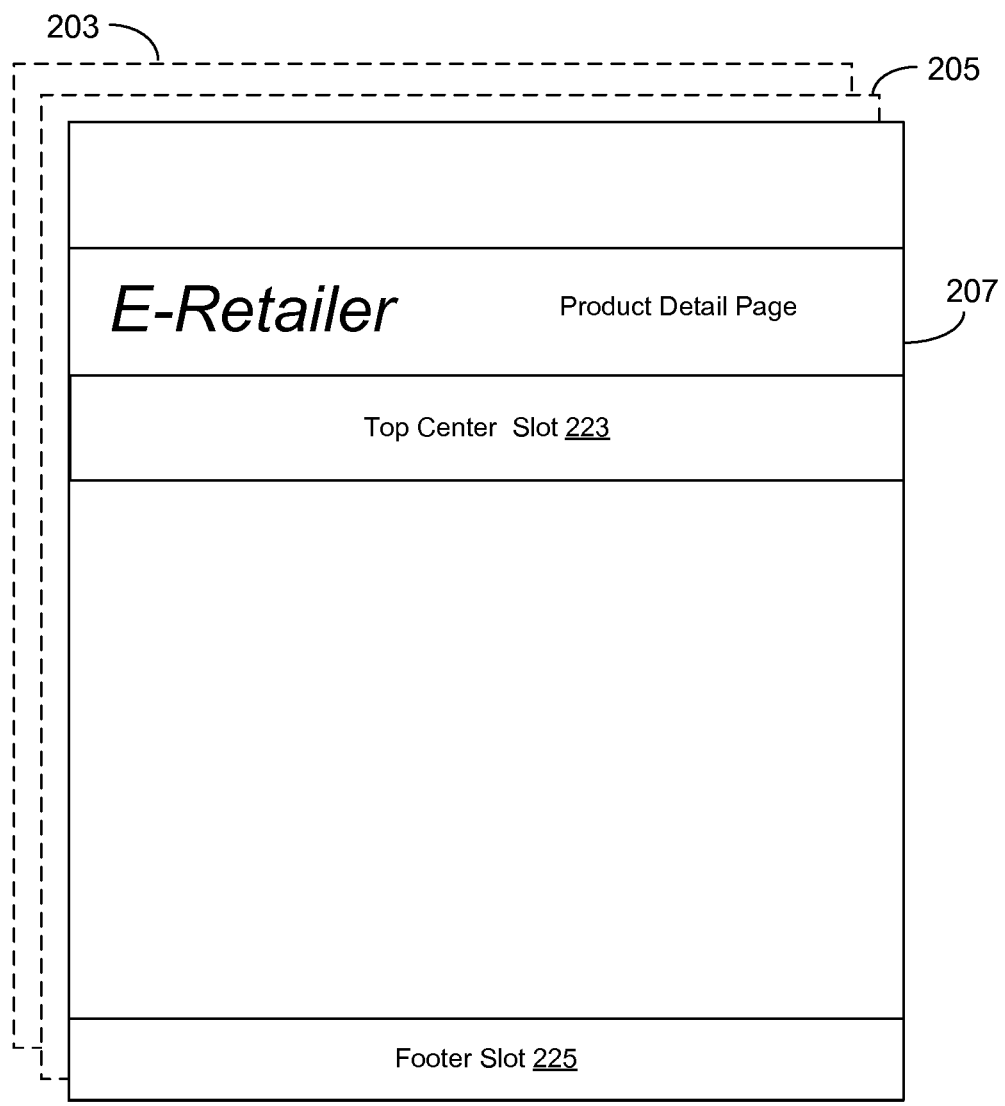

Referring next to FIGS. 2-4, shown is one example of a representation of a page pipeline 201 according to an embodiment of the disclosure. In the depicted example, the page pipeline 201 can include a series of content pages, content page 203, content page 205, and content page 207, that a user may traverse within a site facilitated by the content page generation application 118. In other words, the content pages 203, 205, 207 each correspond to a page template 124. The example of FIG. 2 is purely illustrative and is not meant to represent a page pipeline containing a content page generated by the content page generation application 118 or a page template 124 from which a content page is generated. The illustrative example of FIG. 2 shows the various page slots 131 that can be defined by a page template 124 corresponding to the content page 201. As shown in FIG. 2, slots 206a, 206b, and 206c are positioned in a center portion of the content page 201 and may be associated with a respective placement values from highest to lowest in that order. Slots 207a, 207b, 207c, and 207d may be associated with lower placement values than slots 207a, 207b, and 207c and are ranked from highest to lowest from left to right as they appear in the content page 203. A footer slot 215 may be associated with the lowest placement value relative to the other page slots within the content page 203.

Reference is now made to FIG. 3, which continues the example of FIG. 2. FIG. 3 illustrates the content page 205 in the page pipeline 201 shown in FIG. 2. The content page 205 represents the second page in the page pipeline 201. In the depicted example, the content page 203 is a homepage associated with a site facilitated by the content page generation application 118, and the content page 205 is a search results page associated with the site. As in the example of FIG. 2, the content page 205 includes various pages slots 217, 219, and 221 to which UI widgets 125 can be assigned within the page pipeline 201. Continuing the example of FIG. 4, reference is now made to FIG. 5, which illustrates the content page 207 from the page pipeline shown in FIGS. 2-3. In the depicted example, the content page 207 is a product detail page associated with a site facilitated by the content page generation application 118. As in the example of FIG. 2, the content page 205 includes various pages slots 223, 225 to which UI widgets 125 can be assigned within the page pipeline 201.

Accordingly, when a request to generate the content page is received by the content page generation application 118, the content page generation application 118 can consider the various UI widgets 125 for placement within any of the page slots of the page pipeline 201. As noted above, in some embodiments, the content page generation application 118 can generate an event that informs the various UI widgets 125 of the incoming request, which can in turn submit requests to schedule content within the content page that is generated by the content page generation application 118. The content page generation application 118 can generate a ranking according to a placement score and/or performance data 137 associated with the UI widgets 125 considered to schedule content in the content page.

In order to assess the UI widgets 125 with respect to page slots in the page pipeline 201, the content page generation application 118 identifies a page pipeline 201 in which a user and/or request should be placed based at least in part upon the arrival conditions associated with the request to generate the content page 203 representing the first page in the page pipeline 201. The content page 203 may be a member of multiple page pipelines specified by the page pipeline data 128. Additionally, the content page 203 may not represent the first page in these other page pipelines, but the content page generation application 118 may place the request in a page pipeline depending upon the arrival conditions of the user.

Figure 5:
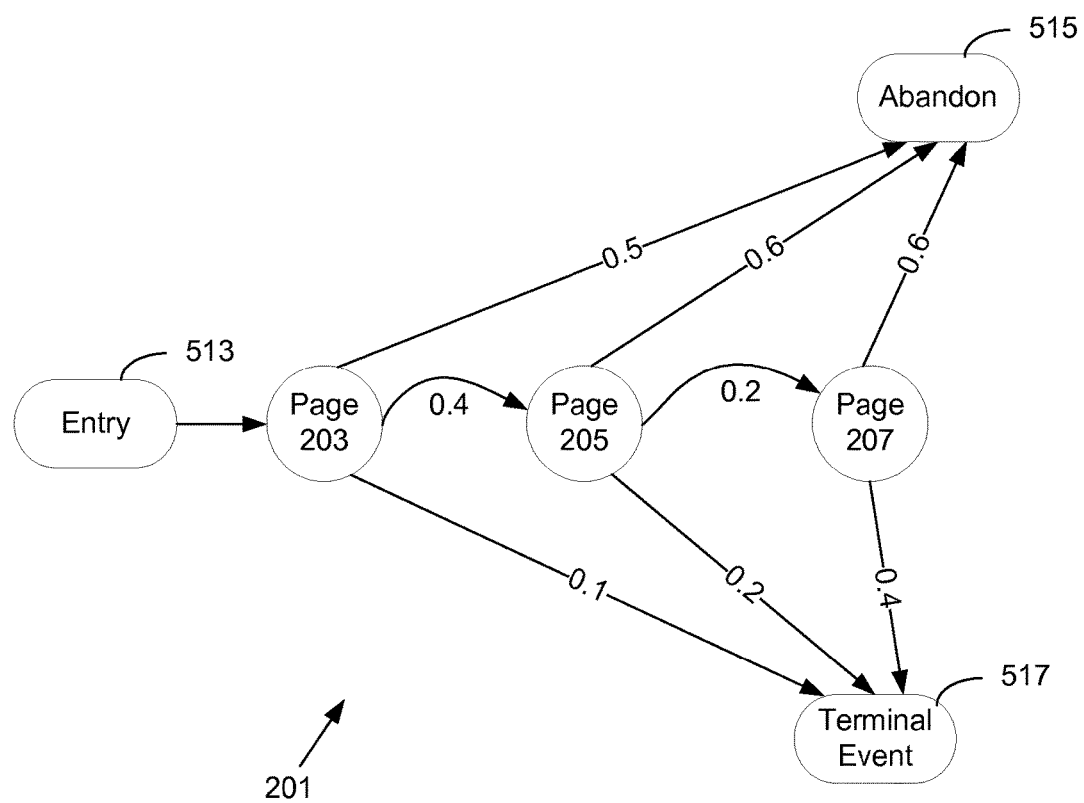
FIG. 5 is an alternative representation of the page pipeline discussed with reference to FIGS. 2-4 according to various embodiments of the present disclosure.

Accordingly, reference is made to FIG. 5, which illustrates an alternative representation of the page pipeline 201 that is discussed and depicted with reference to FIGS. 2-4. The page pipeline 201 shown in FIG. 5 can be one of many page pipelines for which data is stored in the data store 212 as page pipeline data 128. A user and/or a request for a content page can be placed into the page pipeline 201 at the entry 513 stage based upon the arrival conditions that the content page generation application 118 can detect regarding the user and/or request. The arrival conditions can include a referrer link and/or referring page, shopping cart data in the case of an electronic commerce site, user profile data, session data, data obtained from cookies stored in a browser executed on a client device. For example, if the user arrives at page 203 from an advertising link, the user can be placed into one page pipeline. However, page 203 may also be associated with another page pipeline. Therefore, if the user arrives at page 203 without a referrer link, the user may be placed into the other page pipeline. In this scenario, the two page pipelines may comprise completely different ordered lists of pages aside from the initial page 203.

As shown in the example of FIG. 5, the page pipeline can also be associated with a probability that the user, or any given user, will progress to another stage in the page pipeline. For example, there can be a probability that a given user in a given request will progress to a subsequent stage of the page pipeline 201. In the depicted example, there is a 50% probability that the user will abandon 515 the page pipeline 201 from page 203 and navigate to a site and/or page and is not within another page pipeline for which page pipeline data is maintained. Also in the depicted example, there is a 40% chance that the user will progress to page 205, or the subsequent page in the page pipeline 201. There is also a 10% chance that the user proceeds to a terminal event 517.

A terminal event 517 can represent any event with respect to the page navigation of the user that is not considered an abandonment of the page pipeline 201. For example, a terminal event 517 can represent any action that the page pipeline 201 and/or placement of content therein is optimized to achieve, such as the addition of a product to a virtual shopping cart, purchase of a product, following a particular hyperlink that is presented in the page, or any other result. In some embodiments, a terminal event 517 can also represent entry into another page pipeline.

Therefore, when a user and/or request is placed into the page pipeline 201 upon receiving a request to generate page 203, the content page generation application 118 can generate a ranking of UI widgets 125 scheduled for placement within the page pipeline 201 as well as generate a content placement value for each of the page slots in each of the content pages of the page pipeline 201. This content placement value can be is weighted according to the probability that the user will progress to the various downstream or subsequent pages of the page pipeline. For example, the page slots in page 205 and 207 may be associated with content placement values, but these content placement values are weighted differently depending upon the page pipeline 201 in which the user is placed because the probability that the user will actually progress to these downstream or subsequent page in the pipeline can vary. Therefore, to match UI widgets 125 with page slots in the page pipeline, the content page generation application 118 weights the content placement value of the page slots in the downstream pages in the page pipeline 201 according to a probability that the user will actually progress to the page on which the page slot appears.

Accordingly, in one example scenario, the content page generation application 118 will scale down the content placement value of a page slot in page 205 in the example of FIG. 5 that has a higher content placement value that a page slot in page 203 by an amount that is based at least upon the probability that a given user will actually arrive at page 205 from page 203. As noted above, these probabilities can be weighted based upon the aggregate behavior of a population of users that is tracked over time as well as based upon specific information that is known about a particular user.

Figure 6:
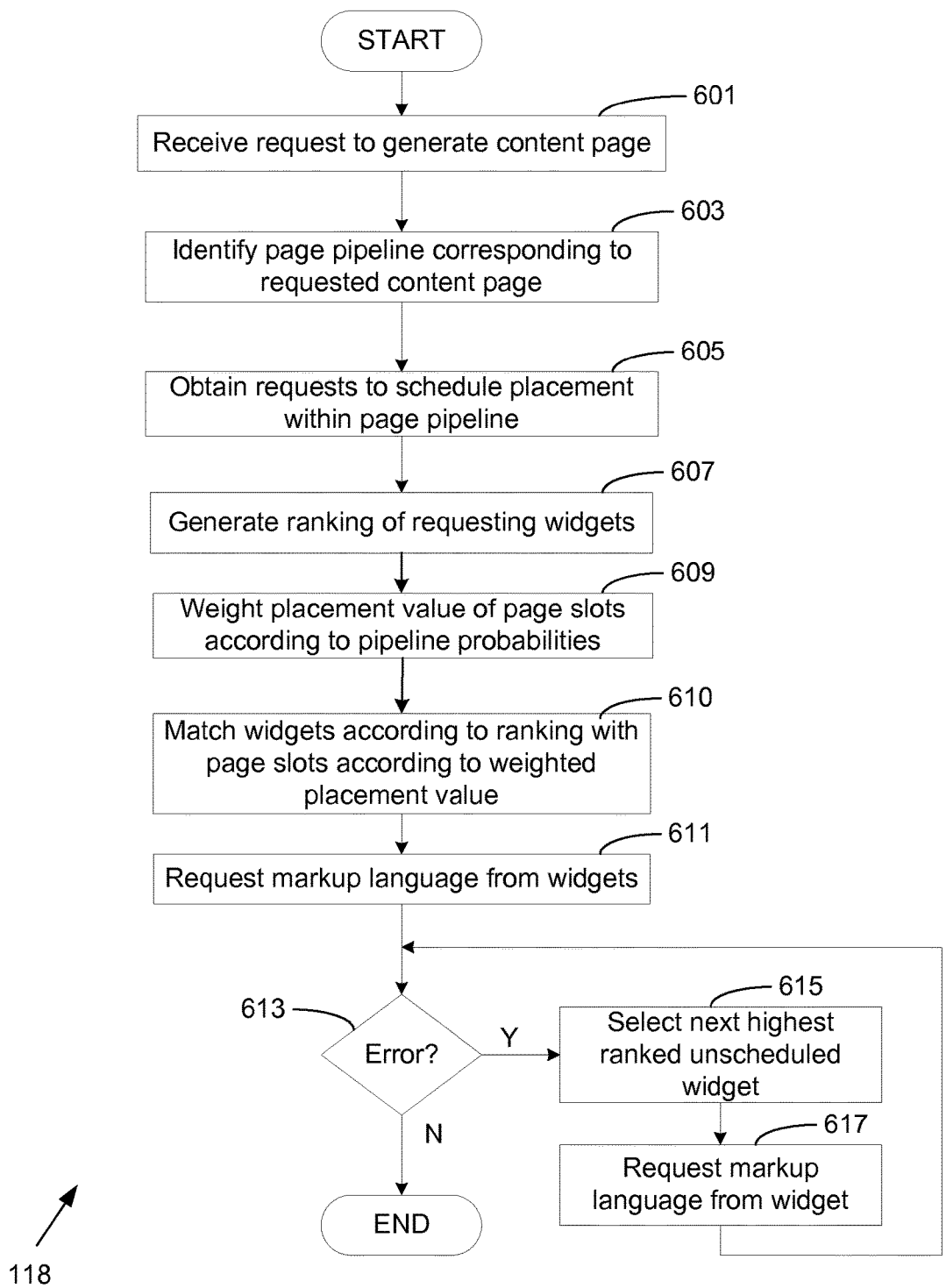
FIG. 6 is a flowchart illustrating an example of functionality implemented as portions of a content page generation application executed in a computing resource in the networked environment of FIG. 1 according to various embodiments of the present disclosure.

Referring next to FIG. 6, shown is a flowchart that provides one example of the operation of a portion of the content page generation application 118 according to various embodiments. It is understood that the flowchart of FIG. 6 provides merely an example of the many different types of functional arrangements that may be employed to implement the operation of the portion of the content page generation application 118 as described herein. As an alternative, the flowchart of FIG. 6 may be viewed as depicting an example of steps of a method implemented in the computing environment 103 (FIG. 1) according to one or more embodiments.

Beginning with box 601, the content page generation application 118 can receive a request to generate a content page that is, for example, requested via browser 148 executed by a client 106 via a network 109. In box 603, the content page generation application 118 identifies a page pipeline corresponding to the requested content page. The page pipeline can be represented by page pipeline data 128 that specifies various the page templates 124 as well as the terminal events associated with the page pipeline. The page pipeline data 128 can also specify the probabilities that users progress from one stage of the page pipeline to another as well as an abandonment rate of the page pipeline at each stage. The page templates 124 within the page pipeline define the structure of the content page that and specify the location, size, placement value, and other attributes associated with page slots 131.

In box 605, the content page generation application 118 receives and/or generates requests to schedule content in the content page. The requests can comprise requests to schedule content within page slots of the various pages within the identified page pipeline that are defined by the page template 124. In some cases, the content page generation application 118 can obtain requests to schedule content that are not slot or page specific. The requests can be received from UI widgets 125 executed by the computing environment 103 and/or generated by the content page generation application 118 by consulting scheduling data 135 and/or performance data 137.

In box 607, the content page generation application 118 generates a ranking of the UI widgets 125 considered for placement in the content page according to an effectiveness metric. In the event that the page template 124 defines slot groups 133, the content page generation application 118 can generate a ranking of the UI widgets 125 requesting placement for each of the slot groups 133. In box 609, the content page generation application 118 weights the placement value of the page slots throughout the page pipeline based upon the probability that a user will advance to the page in the page pipeline on which each of the page slots exists. In box 610, the content page generation application 118 matches the UI widgets 125 with page slots 131 defined by the page templates 124 of the page pipeline according to the effectiveness metric ranking and the weighted placement value of the page slots 131. In other words, the highest ranked UI widget 125 within the page template 124 and/or a particular slot group 133 is matched with the page slot 131 having the highest weighted placement value. Similarly, the second highest ranked UI widget 125 within the page template 124 and/or a particular slot group 133 is matched with the page slot 131 having the second highest weighted placement value, and so on.

In box 611, the content page generation application 118 requests markup language from the UI widgets 125 scheduled for placement within the content page. The markup language can include HTML, for example, and is placed within the content page generated by the content page generation application 118. As noted above, the requests to generate markup language can be initiated in parallel to minimize latency associated with producing a content page responsive to a request from a browser 148.

If one or more of the UI widgets 125 encounters an error and/or fails to generate markup language for inclusion in the content page in its assigned page slot in box 613, the content page generation application 118 can select the next highest ranked UI widget 125 that has not been matched with a page slot 131 in box 615. In some embodiments, the next highest ranked UI widget 125 that has not been matched with a page slot 131 may be one that has already been scheduled for placement in a page slot 131 in the content page. Accordingly, the content page generation application 118 and inform the next highest ranked UI widget 125 of the identity of the widgets that are ranked above the widget within the content page and/or slot group 133 in the event that the widget is context aware. In box 617, the content page generation application 118 can request markup language from the replacement widget. Thereafter, the portion of the content page generation application 118 ends.

Figure 7:
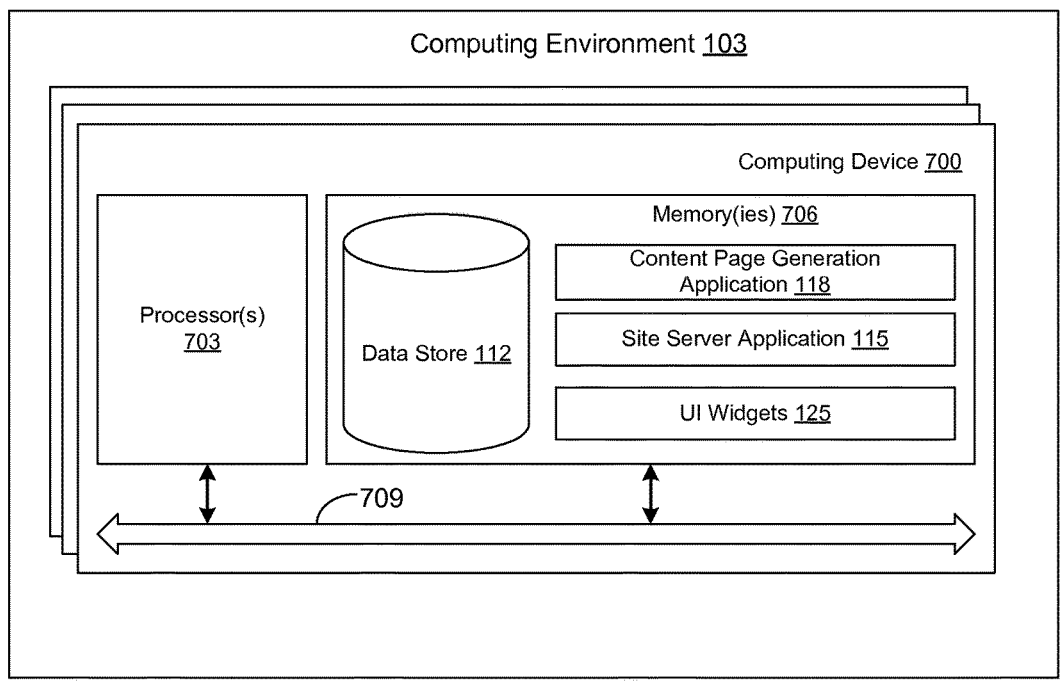
FIG. 7 is a schematic block diagram that provides one example illustration of a computing device employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more appropriate computing device 700. The appropriate computing device 700 includes at least one processor circuit, for example, having a processor 703 and a memory 706, both of which are coupled to a local interface 709. To this end, the appropriate computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 is the content management application 215 and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the content page generation application 118, the site server application 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the content page generation application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content page generation application 118, and the site server application 115, that comprises software or code can be embodied in any computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program, that when executed in a computing device, causes the computing device to at least:
   obtain a request to generate a content page on behalf of a user;
   identify a behavior pipeline in which to place the user based at least in part upon at least one arrival condition associated with the request, the behavior pipeline comprising a plurality of pipeline stages, wherein individual ones of the plurality of pipeline stages are associated with a plurality of content slots, the plurality of content slots being ranked according to a placement value;
   generate a ranking of a plurality of user interface widgets according to an overall probability that a terminal event will occur, the overall probability based on at least one of a first probability that the user will progress to the terminal event or a second probability that the user will progress to a subsequent one of the plurality of pipeline stages, the terminal event comprising at least one of: adding a product to a virtual shopping cart, purchasing the product, following a hyperlink, or entering another page pipeline;
   match the plurality of content slots with at least a subset of the plurality of user interface widgets according to the ranking and the placement value; and
   generate the content page with the subset of the plurality of user interface widgets corresponding to a respective plurality of content slots of the content page.

2. The non-transitory computer-readable medium of claim 1, wherein the program further causes the computing device to at least:
   obtain a second request to generate a subsequent content page corresponding to the subsequent one of the plurality of pipeline stages;
   generate a second ranking of a remaining plurality of user interface widgets according to the overall probability that the terminal event will occur; and
   generate the subsequent content page with a subset of the remaining plurality of user interface widgets corresponding to a respective remaining plurality of content slots of the subsequent content page.

3. The non-transitory computer-readable medium of claim 1, wherein a footer content slot of the plurality of content slots is associated with a lowest placement value.

4. A system, comprising:
   a data store; and
   at least one computing device in communication with the data store, the at least one computing device configured to at least:
      receive a request to generate a content page on behalf of a user;
      identify a page pipeline in which to place the user based at least in part upon at least one arrival condition associated with the request, the page pipeline comprising a plurality of content pages, individual ones of the plurality of content pages being associated with a respective page template comprising a plurality of page slots, wherein individual ones of the plurality of page slots are ranked according to a placement value;

generate a ranking of a plurality of user interface widgets according to an overall probability that a terminal event will occur, the overall probability based on at least one of a first probability that the user will progress to the terminal event or a second probability that the user will progress to a subsequent one of the plurality of content pages, the terminal event comprising at least one of: adding a product to a virtual shopping cart, purchasing the product, following a hyperlink, or entering another page pipeline;

match the plurality of page slots with at least a subset of the plurality of user interface widgets according to the ranking and the placement value; and generate the content page with the subset of the plurality of user interface widgets.

5. The system of claim 4, wherein the placement value is based at least in part upon the overall probability that the terminal event will occur.

6. The system of claim 4, wherein the at least one computing device is further configured to at least:

obtain another request to generate a subsequent content page associated with the subsequent one of the plurality of content pages;

match the plurality of page slots of the subsequent one of the plurality of content pages with a subset of a remainder of the plurality of user interface widgets according to the ranking and the placement value; and generate the subsequent content page with the subset of the remainder of the plurality of user interface widgets.

7. The system of claim 4, wherein the at least one computing device is further configured to at least:

place the user in a first page pipeline with a first content page of the plurality of content pages based at least in part on a first value of an arrival condition of the at least one arrival condition; and place the user in a second page pipeline with the first content page of the plurality of content pages based at least in part on a second value of the arrival condition.

8. The system of claim 4, wherein the at least one computing device is further configured to at least:

obtain a second request to generate a new content page outside of the page pipeline;

identify a new page pipeline based at least in part upon a second at least one arrival condition associated with the second request to generate the new content page, the new page pipeline comprising a plurality of other content pages, ones of the plurality of other content pages being associated with a page template comprising a plurality of other page slots, the plurality of other page slots being ranked according to the placement value;

generate a second ranking of a plurality of other user interface widgets according to the overall probability;

match the plurality of other page slots with at least a subset of the plurality of other user interface widgets according to the second ranking and the placement value; and generate the new content page with the subset of the plurality of other user interfaces.

9. The system of claim 4, wherein the at least one arrival condition comprises at least one of a referrer link, a referrer page, shopping cart data, user profile data, session data, cookie data, or a user account associated with the request.

10. The system of claim 4, wherein the overall probability is based at least in part upon at least one of a user profile of the user or the at least one arrival condition.

11. The system of claim 4, wherein the at least one computing device is further configured to at least generate an event informing the plurality of user interface widgets of the request to generate the content page, wherein at least one of the plurality of user interface widgets is configured to submit a second request to schedule content within the content page.

12. A method, comprising:

identifying, via at least one computing device, an arrival condition associated with a request to generate a content page;

identifying, via the at least one computing device, a page pipeline corresponding to the arrival condition, the page pipeline comprising a plurality of content pages, individual ones of the plurality of content pages being associated with a respective page template comprising a plurality of page slots, the plurality of page slots being associated with a placement value;

generating, via the at least one computing device, at least one ranking of a plurality of user interface widgets according to an overall probability that a terminal event will occur, the overall probability based at least in part on a first probability that a user will progress to the terminal event or a second probability that the user will progress to a subsequent one of the plurality of content pages, the terminal event comprising at least one of: adding a product to a virtual shopping cart, purchasing the product, following a hyperlink, or entering another page pipeline; and matching, via the at least one computing device, at least one of the plurality of page slots with a respective one of the plurality of user interface widgets based at least in part upon the at least one ranking and the placement value.

13. The method of claim 12, wherein the placement value is based at least in part upon the overall probability that the terminal event will occur.

14. The method of claim 12, further comprising:

generating, via the at least one computing device, the content page with a subset of the plurality of user interface widgets placed in respective ones of the plurality of page slots.

15. The method of claim 14, further comprising:

replacing, via the at least one computing device, a failed user interface widget with a next highest ranking one of the plurality of user interface widgets, the failed user interface widget comprises one of the plurality of user interface widgets that encountered an error.

16. The method of claim 15, further comprising:

matching, via the at least one computing device, a lower ranked subset of the plurality of page slots with a respective remaining user interface widget based at least in part upon the at least one ranking and the placement value, where the lower ranked subset comprises ones of the plurality of page slots associated with a placement value lower than the one of the plurality of page slots corresponding to the failed user interface widget.

17. The method of claim 12, further comprising:

receiving, via the at least one computing device, a second request to generate a subsequent content page associated with the subsequent one of the plurality of content pages;

generating, via the at least one computing device, a second ranking of the plurality of user interface widgets according to the overall probability; and matching, via the at least one computing device, the plurality of page slots of a remainder of the subsequent one of the plurality of content pages with a subset of the plurality of user interface widgets according to the second ranking and the placement value.

18. The method of claim 12, wherein identifying the plurality of user interface widgets for placement within the page pipeline is based at least in part on the arrival condition.

19. The method of claim 12, wherein the overall probability is based at least in part upon at least one of a user profile of the user or arrival conditions of the user.

20. The method of claim 12, further comprising requesting, via the at least one computing device, markup language from each of the plurality of user interface widget matched for placement within the content page.

* * * * *